United States Patent
Liu et al.

(10) Patent No.: US 8,056,105 B2
(45) Date of Patent: Nov. 8, 2011

(54) DYNAMIC VIDEO-ON-DEMAND NAVIGATION AND ON DEMAND INGEST

(75) Inventors: Xiaomei Liu, San Jose, CA (US); Gil Cruz, Hampton, NJ (US)

(73) Assignee: Cisco Technology, Inc., San Jose, CA (US)

( * ) Notice: Subject to any disclaimer, the term of this patent is extended or adjusted under 35 U.S.C. 154(b) by 424 days.

(21) Appl. No.: 12/138,233

(22) Filed: Jun. 12, 2008

(65) Prior Publication Data

US 2009/0313661 A1    Dec. 17, 2009

(51) Int. Cl.
*H04N 7/173* (2011.01)
(52) U.S. Cl. ............ 725/87; 725/910; 725/93; 725/110; 725/114
(58) Field of Classification Search ............ 725/87, 725/110, 114; 709/225, 226, 229
See application file for complete search history.

(56) References Cited

U.S. PATENT DOCUMENTS

| 7,216,170 | B2 * | 5/2007 | Ludvig et al. ............... 709/225 |
| 2003/0233451 | A1 * | 12/2003 | Ludvig et al. ............... 709/225 |
| 2006/0130098 | A1 * | 6/2006 | Rao et al. ............... 725/53 |
| 2009/0172751 | A1 * | 7/2009 | Aldrey et al. ............... 725/87 |

* cited by examiner

*Primary Examiner* — Kieu Oanh T Bui

(57) ABSTRACT

A technique for supporting over-the-top video-on-demand separates metadata ingest and real content ingest such that navigation needs only the metadata ingest to have been completed. The real content ingest can occur later if the navigation results in the real content being selected and if the selected content has not been ingested already. Additionally, content identifiers with limited range are used over and over to identify a practically unlimited range of available over-the-top content by mapping virtual content identifiers to dynamic content. The content metadata and real content ingest are synchronized on a video-on-demand system using the dynamically allocated content identifiers. Playlists can be virtualized with a logical content identifier which maps to a list of virtual content identifiers. Existing video-on-demand infrastructures can simultaneously support both static and dynamic content with preexisting video-on-demand back offices and video-on-demand clients.

10 Claims, 1 Drawing Sheet

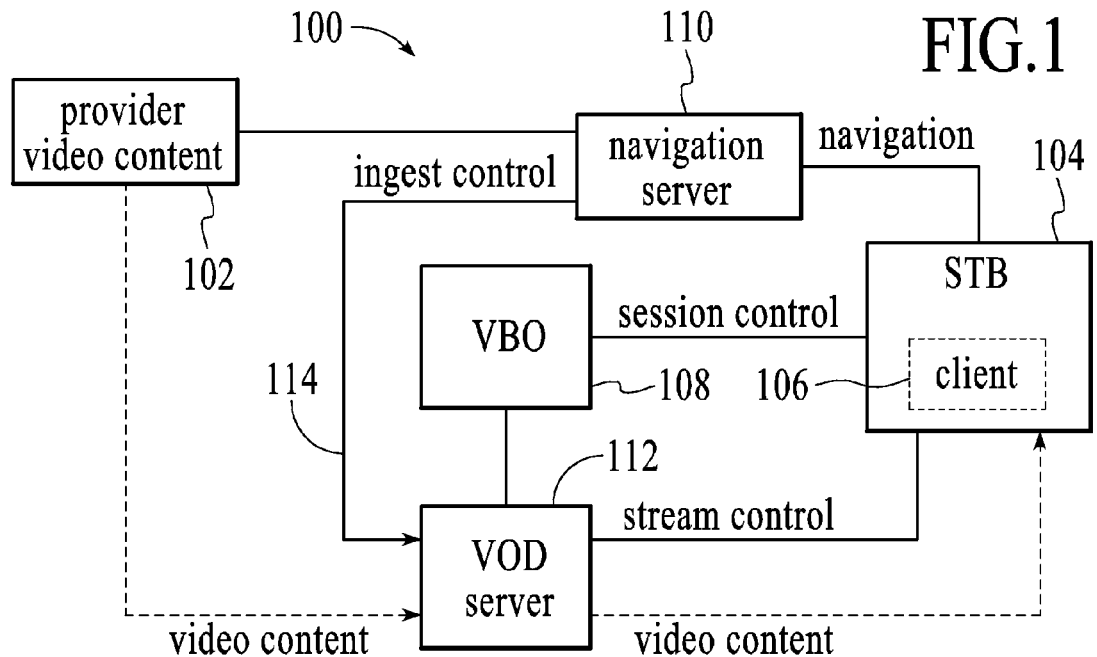
FIG.1
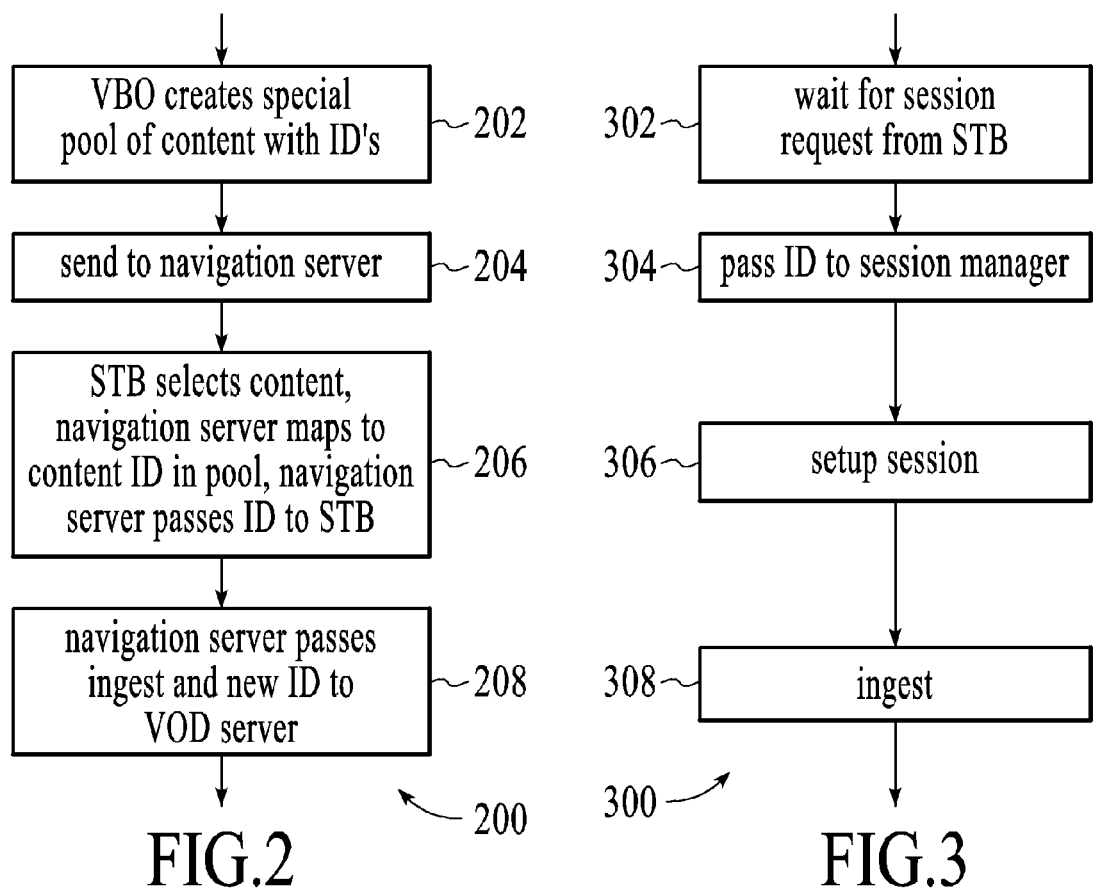
FIG.2
FIG.3

DYNAMIC VIDEO-ON-DEMAND NAVIGATION AND ON DEMAND INGEST

TECHNICAL FIELD

The present disclosure relates to video-on-demand services for consumers, and in particular to systems and methods for allowing consumers to browse through the content from its sources before the actual program material is ingested on-demand.

BACKGROUND

Simultaneously delivering hundreds of video program channels in real time to consumers requires large amounts of expensive bandwidth and there is no guarantee that the viewers will be satisfied with any particular program at any particular time. Digital video recorder (DVR) set top boxes (STBs), like TiVo, allow consumers to selectively record programs that they like and view them later at their convenience. But this still requires that the selected programs must have been broadcast recently and the DVR prepared to capture it. Other distribution channels such as movie theaters and video rental outlets offer very restricted choices, require personal visits to brick-and-mortar locations, and charge premium prices because the content is so fresh from its original release.

Video on-demand (VOD) was initially offered on a few cable channels and the menu of offerings was very limited. Navigating through the short menus was not much of a problem. However, video-on-demand technology and the programming being offered have expanded enormously, and navigating through all of the material to find a program for ingestion into the system and for viewing has become quite a challenge.

The widespread acceptance and installation of broadband Internet now allows an interactive way for consumers to surf through vast stores of video content they would like to select and view. The broadcast bandwidth needed by TV broadcasts, cable systems, and direct satellites, is not needed when only a single program is being viewed. So, the video industry is moving rapidly toward providing consumers with any program content, anywhere, at anytime.

For example, a device can be attached to the back of a television set to provide access to streaming video delivered over a broadband connection. This service is widely referred to as "over-the-top". Because traditional middleman distribution services are bypassed, the video content goes directly to the consumer on top of the broadband connection. For service providers that have a large installed base of video service delivery infrastructure for linear and on-demand video services, being able to provide access to over-the-top content through existing infrastructure is a great value.

Compared to traditional video-on-demand, online video is more dynamic, has more titles in short format, and depends on different video encoding formats. While the video encoding format problem can be solved with universal transcoding, the dynamic nature and the plethora of over-the-top content create new challenges to the existing video-on-demand system.

Conventional video-on-demand back offices (VBO) control video-on-demand ingest on video-on-demand servers. The ingest process does not provide enough automation to support dynamic ingest. Dynamic ingest is triggered, e.g., when a VOD server application does not find a client's requested content in its local storage. In typical VOD current architectures, the navigation server is tightly coupled with video-on-demand content management, and the video-on-demand navigation only allows a set top box to navigate among content that has been previously ingested to the video-on-demand system. Some video-on-demand navigation servers support searches, but the searches are limited to previously ingested video content. Though this works fine for a movies-on-demand service that has a limited number of titles and the release schedule is rather static, this is not a good approach for the more dynamic over-the-top content.

In a typical video-on-demand system, the VOD back office is a complicated control plane system that provides the basic control infrastructure to deliver video-on-demand service. Any new on-demand video features must be added through the video-on-demand back office which slows down the service velocity for the service provider to launch any new on-demand video services. Video-on-demand navigation servers provide the user interface on a STB that is needed to navigate the available video-on-demand content. Conventional video-on-demand navigation servers are tightly coupled with video-on-demand back office content management and the navigation server communicates with a video-on-demand back office to build a menu hierarchy and search databases using all of the titles that have already been ingested and processed.

The ingest of content for conventional video-on-demand servers, e.g., movies-on-demand, is prearranged and happens regardless of what users are selecting to watch. Prearranging the ingest of all available over-the-top content not only wastes system resources since most of the content will not be watched at all, but it is also becoming technically infeasible considering the dynamic nature of over-the-top content and the potentially infinite amount of content available. In many cases, the existing VOD navigation and back office systems also impose severe scalability limits on the total number of uniquely addressable assets—they were designed to manage a relatively short number of premium, long-form assets and not the massive number of assets available in an over-the-top environment.

SUMMARY

A technique for supporting over-the-top video-on-demand involves separating metadata ingest and real content ingest such that navigation needs only the metadata ingest to have been completed. The real content ingest can occur later if the navigation results in the real content being selected and if the selected content has not been ingested already. Additionally, content identifiers with limited range are used over and over to identify a practically unlimited range of available over-the-top content by mapping virtual content identifiers to dynamic content. The content metadata and real content ingest are synchronized on a video-on-demand system using the dynamically allocated virtual content identifiers. Playlists can be virtualized with a logical content identifier which maps to a list of virtual content identifiers. Existing video-on-demand infrastructures can simultaneously support both static and dynamic content with preexisting video-on-demand back offices and video-on-demand clients.

BRIEF DESCRIPTION OF THE DRAWINGS

FIG. 1 is a functional block diagram of a video-on-demand system.

FIG. 2 is a flowchart diagram of a method or computer program for an over-the-top video-on-demand system, such as in FIG. 1.

FIG. 3 is a flowchart diagram of a method or computer program for when to ingest content in an over-the-top video-on-demand system, such as in FIG. 1.

DESCRIPTION OF EXAMPLE EMBODIMENTS

FIG. 1 depicts a video-on-demand (VOD) system 100 that provides video content 102 from various providers to a set-top-box (STB) 104 with a VOD navigation client 106. Session control is maintained over a broadband Internet connection by a VOD back office (VBO) 108 and a VOD navigation server 110 allows a consumer to find the video content that the consumer wishes to view. Selected video content is delivered to STB 104 via a VOD server 112.

The VBO 108 is used to statically create a special pool of dynamic video-on-demand content with each content title having its own special virtual content identifier. The special pool of virtual content identifiers is then provided to the navigation server 110. When a user of STB 104 selects a particular title of over-the-top content, navigation server 110 maps the selected title to an available content identifier in its virtual content identifier pool, and passes the information to the set-top-box 104 through its navigation interface. The mapping of the selected title to an available content identifier includes the virtual content identifier, the ingest location, the metadata needed for the ingest, and how long it should remain on the video-on-demand server 112 in the form of a time-to-live value. The navigation server 110 passes content ingest information 114, and a newly assigned content identifier to video-on-demand server 112. Such mapping can be communicated using a web service interface or similar methods.

The ingest operation can commence anytime after the video-on-demand server 112 gets the necessary virtual content identifier and ingest location information. Therefore, the ingest of over-the-top content can be postponed until a session for the content is actually requested by the user. In an embodiment, ingested on-demand content is archived for later use.

The VOD navigation client 106 gets the virtual content identifiers that correspond to the selected content. A video-on-demand session can be requested by the set-top-box 104 by passing the virtual content identifier to a session manager. Each session setup begins with the video-on-demand back office 108 and concludes with the responsible video-on-demand server 112. The virtual content identifier is created by the video-on-demand back office 108 when the session signaling passes through. The video-on-demand back office 108 treats the content as a conventional static video-on-demand content. The VOD navigation client 106 does not need to translate or accommodate anything different, and is unaware of any differences between static content and dynamic content.

When the video-on-demand server 112 gets a request to setup a session for a particular title of video content, it verifies if the content identifier actually belongs to the virtual content identifier pool. If yes, the video-on-demand server checks to see if the content is currently on the video-on-demand server. An ingest is triggered if the content is not on the video-on-demand server already. When the video-on-demand server receives the play request from the set-top-box, the content will be ready to play.

In an embodiment, the navigation server 110 maps the dynamic content to a virtual content identifier. For example, the mapping is similar to a virtualized data cache system where K-number of items are mapped into N-number of fixed slots, and K is assumed to be much larger than N.

FIG. 2 is a process flow diagram of a method 200 for over-the-top content access. The method 200 begins with a step 202 in which a VBO is used to statically create a special pool of dynamic video-on-demand content with each title of content having its own special virtual content identifier. The special pool of virtual content identifiers is then provided to a navigation server in a step 204. In a step 206, when a user STB selects a particular title of over-the-top content, the navigation server maps the selected title to an available content identifier in its virtual content identifier pool and passes the information to the set-top-box 104 through its navigation interface. The mapping of the selected title to an available content identifier includes the virtual content identifier, the ingest location, the metadata needed for the ingest, and how long it should remain on the video-on-demand server in the form of a time-to-live value. In a step 208, the navigation server passes content ingest information, and a newly assigned content identifier to a video-on-demand server.

FIG. 3 represents a method 300 that operates asynchronously with the method 200 of FIG. 2. In a step 302, an ingest operation can commence anytime after a video-on-demand server gets the necessary virtual content identifier and ingest location information. The ingest can be postponed until a session for the content is requested by a user. Then, the video-on-demand server starts the on-demand content ingest. In a step 304, the VOD navigation client 106 gets the virtual content identifiers that correspond to the selected content. A video-on-demand session can be requested by the set-top-box by passing the virtual content identifier to a session manager. In a step 306, each session setup begins with the video-on-demand back office, and concludes with the responsible video-on-demand server. Since the virtual content identifier is originally created by the video-on-demand back office, when the session signaling passes the identifier through the video-on-demand back office, the video-on-demand back office treats the content as a conventional piece of static video-on-demand content. The VOD navigation client does not need to translate or accommodate anything different, and is unaware of any differences between static content and dynamic content. In a step 308, when the video-on-demand server gets a request to setup a session for the requested content, it verifies if such content identifier actually belongs to the virtual content identifier pool. If yes, the video-on-demand server checks to see if the title of content is currently on the video-on-demand server. An ingest is triggered if the content is not on the video-on-demand server already. By the time the video-on-demand server receives a play request from the set-top-box, the content is ready to play.

Virtual content pools can only have a limited number of virtual content identifiers for practical reasons. However, a virtual content identifier can be reused after its timeout period. The timeout information, e.g., a time-to-live value, is passed to the video-on-demand server 112 for synchronization. An asynchronous feedback message can be used by the video-on-demand server 112 to update the navigation server 110 about any ingest problems, or to verify that certain content has been deleted from the video-on-demand server.

Navigation server 110 can decide to reuse virtual content identifiers that were used previously, but only after their respective timeout periods. Or, to be safe, the re-use is postponed until after an asynchronous feedback message from the video-on-demand server verifies the deletion of the old identifier and its corresponding content. The navigation server may also need to remove content from a menu system when ingest problems are detected.

For playlists, the navigation server 110 can use logical content identifiers which map to a list of virtual content identifiers. Each virtual content identifier identifies a single content title. A mapping table sent from the navigation server to the video-on-demand server can include logical content identifier maps to lists of virtual content identifiers. For example, [logical content identifier-1, virtual content identifier-A, virtual content identifier-B, and time-to-live on video-on-demand server]; and, [logical content identifier-2, virtual content identifier-C, virtual content identifier-B, and time-to-live on video-on-demand server].

Conventionally, in order to support on-demand ingest, the video-on-demand back office 108, the video-on-demand server 112, the navigation server 110, and the set-top-box 104 all needed to be synchronized for the creation of virtual content identifiers in a traditional video-on-demand back office 108.

Here, virtual content identifiers are assigned to dynamic content when triggered to do so by the user selection through the video-on-demand navigation server 110. The video-on-demand back office 108 and set-top-box 104 are unaware of any differences between dynamic content and static content, and as a result the synchronization process is greatly simplified. Only the navigation server 110 and the video-on-demand server 112 need to be synchronized to handle the mapping of the dynamic content to their virtual identifiers. As a consequence, conventional and already installed STBs 104 and VBOs 108 can be incorporated into new installations of system 100.

For the on-demand ingest to work, each video-on-demand server 112 must have a real time interface with the navigation server 110. After a navigation server 110 maps a user selection of the content to its virtual content identifier, the interface is ready to pass the virtual content identifiers and their ingest locations to the video-on-demand server 112. The interface must also synchronize ingest status to the navigation server 110.

All video content 102 should be in a format already supported by the video-on-demand server 112. The capabilities of the set-top-box 104 must also be considered in the on-demand ingest, as some set-top-boxes 104 can support advanced coding. One solution is to use a lowest common denominator format compatible with all set-top-boxes. Or, the content providers could provide multiple copies of the same content with different encoding formats. Alternatively, a universal transcoding can be used to support different video-on-demand server and set-top-box capabilities. But transcoding would add substantial latency that could degrade the video quality.

Navigation servers are used for mapping stubbed, or dummy content to real content. Herein, "real content" refers to files that include the full video data file and such file can be quite large and time consuming to download. There is therefore a reluctance to download such a large file if nothing yet indicates it will really be needed, and the limited storage available can be put to more immediate uses. A dummy content pool provides room for only a limited number of content references. In an embodiment, at the time of system initialization, the VOD back office creates the dummy content pool and instructs the VOD server 112 to ingest dummy content. The dummy content in the pool will be replaced by the navigation server 110 as user selection of dynamic content starts. This pool is reused after a certain timeout period. The timeout information is passed to the VOD server 112 for synchronization and the navigation server sends the mapping table to the VOD server. The mapping has a virtual content identifier, a content ingest location, some metadata necessary for the ingest time, and a time-to-live on the VOD server. When a VOD server gets a request to setup the session to deliver the corresponding content, it verifies if the content ID is one that belongs to a virtual content ID pool. If yes, the VOD server checks to see if the content is already on the VOD server 112. An ingest will be triggered if the content is not on the VOD server.

When the VOD server 112 receives a play request from the STB 104, the content will be ready to play. An asynchronous feedback message allows the VOD server to tell the navigation server about ingest problems, and/or to verify that the content stored there was deleted from the VOD server. The navigation server can remove references to the content from the menu system if there was an ingest problem.

For on-demand ingest, the content must be in a format already supported by the VOD server. Otherwise, the transcoding adds additional delay that makes the user experience less attractive. Having the content originator do the transcoding also has the advantage of needing to do the transcoding only once.

In an embodiment, the video-on-demand back office orchestrates each video session setup, resource allocations, user authorization, and billing. If existing video-on-demand system components are left unmolested, new installations of system 100 can quickly provide over-the-top content 102 to a set top box 104.

In system 100, each unique title of video-on-demand content is permanently associated with a content identifier. The CableLab content delivery interface (ADI) Specification defines a video-on-demand content identifier format which includes a provider identifier and 20-byte content identifier. The provider identifier can be a service provider, e.g., Comcast.com. The content identifier has 4-byte letters and 16-byte digits.

The static association of video content with its corresponding CableLab ADI content identifier works fine with movie video-on-demand, but this structure cannot be scaled up and applied to the vast multitudes of over-the-top content because of the limited descriptor space. Here, these limitations are overcome by dynamically associating a World Wide Web uniform resource locator (URL/URN) with a convenient, non-unique content identifier. This allows the reuse of the non-unique content identifiers for over-the-top content being held in a pool. Static content associates a single pre-defined content identifier during the content's entire lifetime.

The video-on-demand system 100 must work seamlessly with both statically and dynamically assigned identifiers. The VOD navigation server 112 determines for itself if the video content being browsed has been associated by dynamic or static identifiers. For example, to determine if ingest will be required as a precondition to being able to deliver the content to the user if selected.

The video-on-demand navigation client 106 uses content metadata to search and navigate the on-demand content. It does not need the video content 102 itself. The content metadata is obtained when the video content is ingested. The metadata and the video content are pushed from the content providers 102 to the video-on-demand service providers. The video-on-demand navigation server 100 can not search or navigate content that have not yet been ingested.

The navigation and search can be extended beyond what has already been ingested by separating content metadata from the corresponding video content ingest. The metadata is pulled by the navigation server from the content providers first. The navigation server can then provide the user with the interface needed to find all of the possible content. The content ingest does not need to occur unless the video content is presently selected by a user, and that video content has not already been ingested to the video-on-demand server.

The navigation server may obtain metadata for over-the-top content from the original content providers, MSOs, and online video aggregators. The metadata could be available through RSS feed, XML web interface or other published interfaces. The navigation server periodically updates the metadata and makes these titles available to the set top box for navigation and selection. The navigation server may also personalize the content selection based on set top box identifier. A potentially unlimited amount of over-the-top content can be supported with a fixed amount of storage on video-on-demand servers since the video-on-demand server only ingests the video content that is actually selected by the end user, instead of ingesting all the possible over-the-top content.

The VOD system 100 greatly simplifies how new on-demand services can be created and increases the speed with which new content and services can be provided. New content and services can be provided without changing preexisting set-top-box clients 104. The VOD system 100 works independent of any particular video-on-demand back office 108 and can function with many existing video-on-demand back office systems. The methods employed can scale with the number of over-the-top titles by including re-usable virtual content identifiers. A low latency system is made possible since on-demand ingests do not depend on the video-on-demand back office 108, and the real time signaling complexity is reduced for each ingest. Video-on-demand server storage is conserved and only the content that is requested by the user is ingested. Navigation that is independent of content ingest allows for navigation personalization and dynamic navigation. Over-the-top content navigation data can be updated frequently to reflect the nature of the content. Such content identifier virtualization methods can also be generalized to support playlist functions.

While there have been disclosed several particular example embodiments, those skilled in the art will recognize that many changes may be made thereto without departing from the spirit and scope of the invention, which is set forth in the following claims.

What is claimed is:

1. A method for supporting over-the-top video-on-demand services at a client, the method comprising:
    ingesting metadata for over-the-top content titles at a navigation server such that a client navigation operation of the titles of the over-the-top content depends only on the metadata ingest having been completed at the navigation server;
    providing a limited number of virtual content identifiers to the navigation server;
    in response to a user of the client selecting a title of over-the-top content, at the navigation server, mapping the selected title to an available one of the virtual content identifiers, wherein the mapping includes the virtual content identifier, an ingest location, and a time-to-live value that indicates how long the ingested content should remain on a video-on-demand server;
    passing the virtual content identifier to the client;
    passing the virtual content identifier and the ingest location to the video-on-demand server;
    receiving a request for the title from the client, the request identifying the title using the virtual content identifier;
    ingesting real content corresponding to the title of the over-the-top content at the video-on-demand server in response to the request from the set-to-box; and
    allowing the virtual content identifier to be reused to identify another title of the over-the-top content after the expiration of the time-to-live value.

2. The method of claim 1 further comprising postponing the reuse of the virtual content identifier until after an asynchronous feedback message from the video-on-demand server verifies the deletion of the old virtual content identifier and its corresponding content.

3. The method of claim 1 wherein mapping the selected title to an available one of the virtual content identifiers comprises dynamically associating a World Wide Web uniform resource locator (URL) with an available one of the virtual content identifiers.

4. An over-the-top video-on-demand system comprising:
    a navigation server; and
    video-on-demand server;
    wherein the navigation server is configured to:
        ingest metadata for over-the-top content titles such that a client navigation operation of the titles of the over-the-top content depends only on the metadata ingest having been completed at the navigation server;
        in response to a user of the client selecting a title of over-the-top content, map the selected title to an available one of the virtual content identifiers, wherein the mapping includes the virtual content identifier, an ingest location, and a time-to-live value that indicates how long the ingested content should remain on a video-on-demand server;
        pass the virtual content identifier to the client;
        pass the virtual content identifier and the ingest location to the video-on-demand server;
    wherein the video-on-demand server is configured to:
        receive a request for the title from the client, the request identifying the title using the virtual content identifier;
        ingest real content corresponding to the title of the over-the-top content at the video-on-demand server in response to the request from the client; and
    wherein the navigation server is further configured to allow the virtual content identifier to be reused to identify another title of the over-the-top content after the expiration of the time-to-live value that is mapped to the selected title.

5. The over-the-top video-on-demand system of claim 4 wherein the navigation server is further configured to postpone the reuse of the virtual content identifier until after an asynchronous feedback message from the video-on-demand server verifies the deletion of the old virtual content identifier and its corresponding content.

6. The over-the-top video-on-demand system of claim 4 wherein mapping the selected title to an available one of the virtual content identifiers comprises dynamically associating a World Wide Web uniform resource locator (URL) with an available one of the virtual content identifiers.

7. An over-the-top video-on-demand system comprising:
    a navigation server, wherein the navigation server is configured to:
        ingest metadata for over-the-top content titles such that a client navigation operation of the titles of the over-the-top content depends only on the metadata ingest having been completed at the navigation server;
        in response to a user of the client selecting a title of over-the-top content, map the selected title to an available one of the virtual content identifiers, wherein the mapping includes the virtual content identifier, an ingest location, and a time-to-live value that indicates how long the ingested content should remain on a video-on-demand server;
        pass the virtual content identifier to the client;
        pass the virtual content identifier and the ingest location to a video-on-demand server;
    wherein the navigation server is further configured to allow the virtual content identifier to be reused to identify another title of the over-the-top content after the expiration of the time-to-live value that is mapped to the selected title.

8. The over-the-top video-on-demand system of claim 7, further comprising a video-on-demand server configured to:
- receive a request for the title from the client, the request identifying the title using the virtual content identifier; and
- ingest real content corresponding to the title of the over-the-top content at the video-on-demand server in response to the request from the client.

9. The over-the-top video-on-demand system of claim 7 wherein the navigation server is further configured to postpone the reuse of the virtual content identifier until after an asynchronous feedback message from a video-on-demand server verifies the deletion of the old virtual content identifier and its corresponding content.

10. The over-the-top video-on-demand system of claim 7 wherein mapping the selected title to an available one of the virtual content identifiers comprises dynamically associating a World Wide Web uniform resource locator (URL) with an available one of the virtual content identifiers.

* * * * *